United States Patent
Shen et al.

(10) Patent No.: US 9,411,745 B2
(45) Date of Patent: Aug. 9, 2016

(54) MULTI-CORE HETEROGENEOUS SYSTEM TRANSLATION LOOKASIDE BUFFER COHERENCY

(71) Applicant: QUALCOMM Incorporated, San Diego, CA (US)

(72) Inventors: Jian Shen, San Diego, CA (US); Lew Go Chua-Eoan, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 14/046,341

(22) Filed: Oct. 4, 2013

(65) Prior Publication Data
US 2015/0100753 A1    Apr. 9, 2015

(51) Int. Cl.
*G06F 12/10*    (2016.01)

(52) U.S. Cl.
CPC ........ *G06F 12/1027* (2013.01); *G06F 12/1009* (2013.01); *G06F 12/1036* (2013.01); *G06F 2212/656* (2013.01)

(58) Field of Classification Search
CPC ............ G06F 12/1027; G06F 12/1009; G06F 12/1036; G06F 2212/656
See application file for complete search history.

(56) References Cited

U.S. PATENT DOCUMENTS

| | | |
|---|---|---|
| 6,493,812 B1 | 12/2002 | Lyon |
| 7,287,124 B2 | 10/2007 | Cohen |
| 8,156,309 B2 | 4/2012 | Steiss |
| 2007/0005932 A1 | 1/2007 | Covelli et al. |
| 2010/0228944 A1 | 9/2010 | Bassett et al. |
| 2012/0137079 A1 | 5/2012 | Ueda |
| 2013/0031333 A1 | 1/2013 | Sankaran et al. |

FOREIGN PATENT DOCUMENTS

EP    1405191 A2    4/2004

OTHER PUBLICATIONS

International Search Report and Written Opinion—PCT/US2014/056664—ISA/EPO—Dec. 9, 2014.

*Primary Examiner* — Reginald Bragdon
*Assistant Examiner* — Mehdi Namazi
(74) *Attorney, Agent, or Firm* — The Marbury Law Group, PLLC (57) ABSTRACT

Methods, devices, and instructions for performing a reverse translation lookaside buffer (TLB) look-up using a physical address input, including obtaining with a first processor the physical address input, wherein the physical address input indicates a physical address corresponding to a shared memory, obtaining a first mask associated with a first virtual address from a first TLB entry within a TLB associated with the first processor, wherein the obtained first mask is a bit pattern, obtaining from the first TLB entry a first page frame number associated with the shared memory, applying the obtained first mask to the obtained first page frame number to generate a first value, applying the obtained first mask to the obtained physical address input to generate a second value, and comparing the first value and the second value to determine whether the first value and the second value match.

28 Claims, 6 Drawing Sheets

MULTI-CORE HETEROGENEOUS SYSTEM TRANSLATION LOOKASIDE BUFFER COHERENCY

BACKGROUND

Computing devices often include numerous processors for executing various instructions/systems. For example, a smartphone mobile device may utilize an applications processor for performing routines related to a downloaded application as well as a digital signal processor for performing signaling processing operations. Such processors may each be configured to utilize a virtual memory address scheme so their respective processes may access data using simplistic memory addresses that map to various physical addresses within system memory. For example, an applications processor may utilize consecutive virtual addresses to access arbitrary RAM locations associated with data for an application.

Devices are now beginning to utilize various processors of different architectures. Such a heterogeneous system may increase the potential for software to benefit from shared memory and may utilize various application programming interfaces (APIs), such as OpenCL, Renderscript, etc. However, differences in addressing schemes may require inefficient mechanisms using conventional approaches. For example, heterogeneous system devices, such as modern smartphones, may employ both 64-bit and 32-bit processors and/or processing cores. With different architectures, the various processors may utilize different virtual memory address schemes to access the same (or shared) system memory. For example, the same page (or memory block) of RAM may be used by both a first and second processor; however, that page may be referenced by two different virtual addresses by the two processors. The processors in such heterogeneous systems may each utilize a translation lookaside buffer (TLB) that improves the speed and efficiency for accessing system memory via virtual addresses, and thus may require robust support for TLB coherency. TLBs may use many-to-one mapping of virtual pages to physical pages in system or common memory, making the coherent identification of entries expensive in terms of processing time and power consumption.

Techniques exist for maintaining coherency in a multi-core system. For example, there are API commands that modify TLB entries using virtual addresses, such as Linux ARM TLB flush methods flush_tlb_all( ) flush_tlb_mm(memory_block_identifier), flush_tlb_range(memory_block_identifier, start_index, end_index), and flush_tlb_page(virtual_address, virtual_mask). As another example, some systems may perform a TLB "shoot-down" technique that utilizes virtual addresses for look-up and invalidation operations for entries within TLBs. A typical TLB shoot-down procedure may include a first processor sending an interrupt to a second processor including a virtual address to be invalidated in the second processor's page table.

SUMMARY

In an aspect, a method for performing a reverse translation lookaside buffer (TLB) look-up using a physical address input may include obtaining with a first processor the physical address input, wherein the physical address input indicates a physical address corresponding to a shared memory, obtaining a first mask associated with a first virtual address from a first TLB entry within a TLB associated with the first processor, wherein the obtained first mask is a bit pattern, obtaining from the first TLB entry a first page frame number associated with the shared memory, applying the obtained first mask to the obtained first page frame number to generate a first value, applying the obtained first mask to the obtained physical address input to generate a second value, and comparing the first value and the second value to determine whether the first value and the second value match. In another aspect, the method may further include iteratively obtaining a second mask and a second page frame number from other TLB entries within the TLB in response to determining that the first value and the second value do not match, iteratively applying the obtained second mask to the obtained second page frame number to generate the first value, and iteratively applying the obtained second mask to the obtained physical address input to generate the second value, wherein comparing the first value and the second value to determine whether the first value and the second value match may include iteratively comparing the first value and the second value to determine whether the first value and the second value match. In another aspect, iteratively applying the obtained second mask to the obtained second page frame number to generate the first value may include reusing page frame numbers from entries in a system page table without duplication. In another aspect, the method may further include flushing the first TLB entry in response to determining that the first value and the second value match. In another aspect, the method may further include sending a message indicating TLB actions and the physical address to a second processor, wherein the TLB actions may include a TLB flush operation. In another aspect, the method may further include returning an index of the first TLB entry in response to determining that the first value and the second value match. In another aspect, obtaining with a first processor the physical address input may include receiving a message from a second processor including TLB actions and the physical address, and the method may further include clearing an active flag in response to receiving the message transmitted by the second processor, performing the TLB actions indicated in the received message using the returned index of the first TLB entry, and setting the active flag in response to performing the TLB actions.

In an aspect, a multi-core heterogeneous computing device may include means for obtaining with a first processor a physical address input, wherein the physical address input indicates a physical address corresponding to a shared memory, means for obtaining a first mask associated with a first virtual address from a first TLB entry within a TLB associated with the first processor, wherein the obtained first mask may be a bit pattern, means for obtaining from the first TLB entry a first page frame number associated with the shared memory, means for applying the obtained first mask to the obtained first page frame number to generate a first value, means for applying the obtained first mask to the obtained physical address input to generate a second value, and means for comparing the first value and the second value to determine whether the first value and the second value match.

In an aspect, a multi-core heterogeneous computing device may include a first processor, a second processor, and a shared memory, wherein the first processor may be configured with processor-executable instructions to perform operations that may include obtaining with the first processor a physical address input, wherein the physical address input indicates a physical address corresponding to the shared memory, obtaining a first mask associated with a first virtual address from a first TLB entry within a TLB associated with the first processor, wherein the obtained first mask may be a bit pattern, obtaining from the first TLB entry a first page frame number associated with the shared memory, applying the obtained first mask to the obtained first page frame number to generate a first value, applying the obtained first mask to the obtained physical address input to generate a second value, and comparing the first value and the second value to determine whether the first value and the second value match.

In an aspect, a non-transitory processor-readable storage medium having stored thereon processor-executable software instructions configured to cause a first processor to perform operations that may include obtaining with the first processor a physical address input, wherein the physical address input indicates a physical address corresponding to a shared memory, obtaining a first mask associated with a first virtual address from a first TLB entry within a TLB associated with the first processor, wherein the obtained first mask may be a bit pattern, obtaining from the first TLB entry a first page frame number associated with the shared memory, applying the obtained first mask to the obtained first page frame number to generate a first value, applying the obtained first mask to the obtained physical address input to generate a second value, and comparing the first value and the second value to determine whether the first value and the second value match.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "computing device" and "multi-core heterogeneous computing device" are used herein to refer to any one or all of cellular telephones, smartphones (e.g., iPhone), web-pads, tablet computers, Internet enabled cellular telephones, WiFi enabled electronic devices, personal data assistants (PDA's), laptop computers, desktop computers, personal computers, and similar electronic devices equipped with at least a first processor (or first processing unit) and a second processor (or second processing unit), where the architecture or technology of the first processor is different from that of the second processor. For example, a multi-core heterogeneous computing device may include a 64-bit applications processor and a 32-bit auxiliary processor. In various aspects, such devices may be configured with a network transceiver to establish a wide area network (WAN) or local area network (LAN) connection (e.g., an LTE, 3G or 4G wireless wide area network transceiver, a wired connection to the Internet, or WiFi).

Currently, circuitry, hardware, instructions, software, and/or commands for maintaining coherency in multi-core systems are inadequate for heterogeneous systems that use multiple-to-one virtual address schemes. For example, existing API commands that utilize virtual addresses do not function for a heterogeneous system, as these commands assume parity between the virtual addresses used by processors within the system. As another example, known shoot-down techniques for maintaining coherency may involve virtual addresses and/or sequentially reading each entry within the TLB of a processor to identify the entry that has the matching physical frame, requiring many cycles (e.g., a processor may iteratively examine each TLB entry to identify the entries that are related to a certain physical memory address within system memory).

The various aspects provide devices, instructions, and methods for utilizing translation lookaside buffers (TLBs) in a multi-core heterogeneous computing device. In various aspects, a processor of the multi-core heterogeneous computing device may be configured to perform a TLB look-up using a physical address on an associated TLB (i.e., a "reverse TLB look-up"). Such reverse TLB look-up operations may be performed by any processor or processor core within the multi-core heterogeneous computing device that is associated with a TLB (and thus utilizes a virtual address scheme). For example, an applications processor and a DSP within the multi-core heterogeneous computing device may simultaneously or separately perform TLB look-up operations related to their respective TLBs. For simplicity of description, the aspect operations are described below with reference to a "first processor" and a "second processor" within the multi-core heterogeneous computing device. However, such general references are not intended to require or imply a particular order, priority or type of processor.

Performing an aspect method for reverse TLB look-up, a first processor within the multi-core heterogeneous computing device may receive a physical address (or physical address input), such as a system memory location associated with a page that is to be modified based on a context switch by the first processor. The received physical address may be a parameter in a system call (e.g., an API command) or an instruction (e.g., a lower-level instruction within a reduced instruction set). The first processor may obtain a mask corresponding to a virtual address within a first entry of the TLB associated with the first processor. The first processor may also obtain a page frame number associated with the virtual address, such as a page frame number related to the system memory and stored along with the virtual address in the TLB entry. The first processor may generate a first value by applying the obtained mask to the obtained page frame number. In parallel, the first processor may generate a second value by applying the mask to the received physical address. The first processor may then compare the first and second values to determine whether there is a match. If a match is found, the first processor may store the index of the TLB entry associated with the mask (and its corresponding virtual address) in a hit vector used to indicate which TLB entries have the physical addresses, factoring the page size information. Such a "hit" TLB entry may be used by the first processor device to invalidate or flush the entry to promote coherency. In an aspect, multiple hits may be stored in the hit vector (i.e., more than one TLB entry may correspond to the received physical address).

When no match is determined based on comparing the first and second values, the first processor may continue to generate new first and second values using new masks and page frame numbers stored in association with virtual addresses in other TLB entries. In other words, the first processor may iteratively apply masks represented in the TLB to determine whether there is a match with the second value. The first processor may continue this iteratively for all virtual addresses of the various TLB entries. In an aspect, the TLB may be a content-addressable memory (CAM).

In an aspect, a second processor within the multi-core heterogeneous computing device may utilize a lower abstraction, instruction-level functionality for performing reverse TLB-look-ups. In particular, the first processor may utilize a reverse TLB probe instruction that copies a physical address into a control register (e.g., one of the control registers in an ARM processor), applies masks associated with virtual addresses of TLB entries to the physical address, and returns TLB entry (entries) indices when matches are found between the physical address with the masks and page frame numbers (PFN) with the masks. With this instruction-level functionality, the second processor may perform TLB look-up operations in a fast, non-serial manner. An aspect hardware implementation of this instruction-level functionality is shown below in FIG. 2.

In various aspects, processors within the multi-core heterogeneous computing device may be configured to utilize API commands that use physical addresses as input values for various TLB operations, such as inputs indicating which TLB entries to invalidate or flush. The API commands may cause the multi-core heterogeneous computing device to utilize software or hardware implementations of a reverse TLB look-up. For example, processors within the multi-core heterogeneous computing device may use an API command (e.g., flush_tlb_range(memory_block_identifier, start_PA, end_PA) that may cause the execution of a method that invalidates TLB entries of a first processor that coincide with physical addresses within a range for a certain memory block. As another example, processors within the multi-core heterogeneous computing device may use another API command that may cause the use of a hardware or circuitry that flushes TLB entries of a first processor that coincide with a certain physical address (e.g., flush_tlb_page(physical_address, memory_block_identifier)). Such API commands may be valuable for providing processors a convenient manner to implement a physical address space protocol for implementing TLB actions. In an aspect, processors within the multi-core heterogeneous computing device may be configured to utilize API commands to perform batch invalidation of a plurality of TLB entries.

In another aspect, processors within the multi-core heterogeneous computing device may be configured to perform an enhanced TLB shoot-down method or (or shoot-down protocol) in which a processor may utilize physical addresses as input, as opposed to virtual addresses, to identify the TLB entries that should be invalidated. In such a method, the multi-core heterogeneous computing device may utilize hardware, instructions, API calls, or software methods to perform reverse TLB look-up operations as described below.

For example, in response to detecting that translation information related to a virtual address of a page within a first TLB needs to be modified, a first processor within the multi-core heterogeneous computing device may disable inter-processor interrupts, clear an active flag associated with the first TLB (and first processor), lock the system page table, perform a look-up on a first processor's TLB using the physical address using a reverse TLB instruction or circuitry, flush TLB entries related to the physical address, and send a message indicating that a second processor within the multi-core heterogeneous computing device should perform an invalidation operation on entries corresponding to the physical address in the second processor's TLB. Using a method as described above, the second processor may also perform a TLB look-up operation on the second TLB using the physical address, such as via a reverse TLB look-up instruction or circuitry, and may flush any matching TLB entry.

In another aspect, a system or device configured to utilize Distributed Virtual Memory (DVM), such as devices utilizing an ARM architecture, may be configured to utilize the various methods and/or instructions of this disclosure. Multi-cluster coherent CPU systems sharing a coherent set of memory management unit (MMU) page tables in memory may require TLB coherency. For example, when a TLB is a cache of memory management unit (MMU) page tables in memory, such a system may perform invalidations of TLB entries that may contain a stale copy of a MMU page table entry when a master updates page tables. Distributed Virtual Memory support in cache coherency protocols may consist of broadcasting invalidation messages, using physical addresses. DVM messages may support TLB invalidation, branch predictor, virtual or physical instruction cache invalidation (for when a processor has written code to memory) and synchronization, which waits for all previous DVM commands to complete. DVM messages may be sent on a read channel using snoop signaling. A system MMU (SMMU) may make use of the TLB invalidation messages that use physical addresses to ensure its entries are up-to-date.

Figure 1:
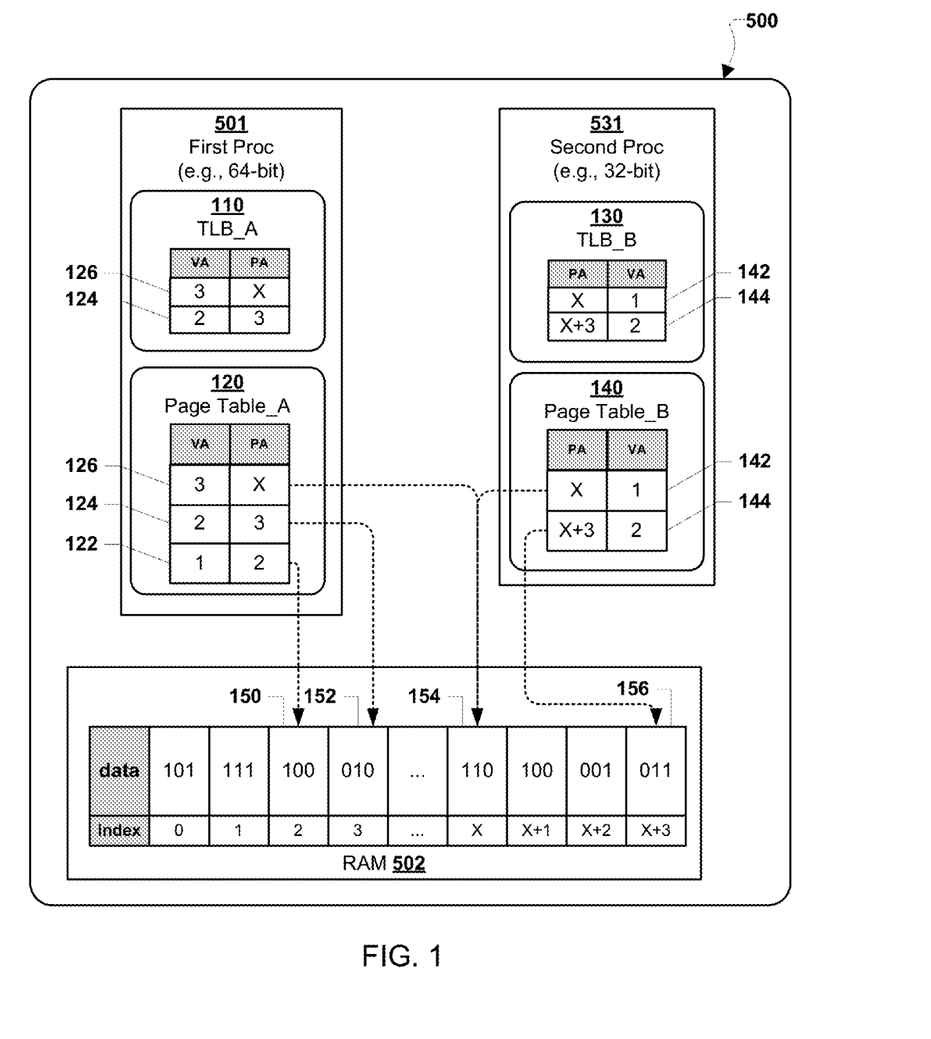
FIG. 1 is a component block diagram of a multi-core heterogeneous computing device that includes a first processor of a first type and a second processor of a second type.

FIG. 1 illustrates a multi-core heterogeneous computing device 500 that includes a first processor 501 of a first type and a second processor 531 of a second type. For example, the first processor 501 may be an applications processor having a 64-bit architecture and the second processor 531 may be a co-processor (e.g., graphics processing unit, digital signal processor, etc.) having a 32-bit architecture. The first processor 501 and/or the second processor 531 may be included in a system-on-chip. The first processor 501 may be associated with a first page table 120 (referred to in FIG. 1 as "Page Table_A") and the second processor 531 may be associated with a second page table 140 (referred to in FIG. 1 as "Page Table_B"), each page table 120, 140 including stored data linking virtual addresses to physical addresses of a shared system memory 502, such as indexed blocks or pages within a random access memory (RAM) that store portions of application data. In an aspect, the system memory 502 may be associated with a system page table (not shown in FIG. 1).

For illustration purposes, the first page table 120 may include a first data record 122 that links a first virtual address (i.e., address '1' corresponding to the first processor 501) to a first physical address memory block 150 (i.e., memory index '2'), a second data record 124 that links a second virtual address (i.e., address '2' corresponding to the first processor 501) to a second physical address memory block 152 (i.e., memory index '3'), and a third data record 126 that links a third virtual address (i.e., address '3' corresponding to the first processor 501) to a third physical address memory block 154 (i.e., memory index 'X'). The second page table 140 may include a fourth data record 142 that links a fourth virtual address (i.e., address '1' corresponding to the second processor 531) to the third physical address memory block 154 (i.e., memory index 'X'), and a fifth data record 144 that links a fifth virtual address (i.e., address '2' corresponding to the second processor 531) to a fourth physical address memory block 156 (i.e., memory index 'X+3').

As the memory 502 is shared system memory, the first page table 120 and the second page table 140 may include data records that include references to the same physical addresses of the memory 502. As a non-limiting illustration: the third data record 126 may link the third virtual address (i.e., address '3' corresponding to the first processor 501) to the third physical address memory block 154 (i.e., memory index 'X') and the fourth data record 142 may link the fourth virtual address (i.e., address '1' corresponding to the second processor 531) to the third physical address memory block 154. In other words, via the page tables 120, 140 both the first processor 501 and the second processor 531 may link to and access the same data stored in shared system memory 502 using different virtual addresses.

The first processor 501 may also be associated with a first TLB 110 (referred to in FIG. 1 as "TLB_A") and the second processor 531 may be associated with a second TLB 130 (referred to in FIG. 1 as "TLB_B"), each TLB 110,130 including stored data from the first page table 120 and the second page table 140, respectively. For example, the first TLB 110 may include a subset of the data records 124, 126 of the first page table 120 and the second TLB 130 may include a subset (or all) of the data records 142, 144 of the second page table 140.

Figure 2:
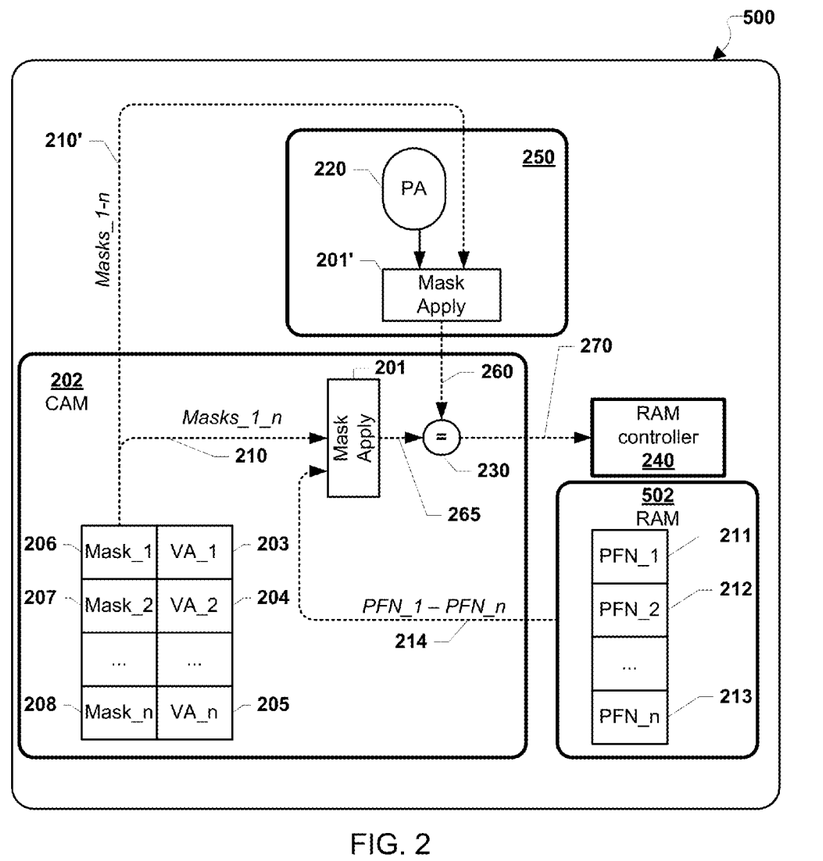
FIG. 2 is a component block diagram of aspect logic circuitry configured for utilizing a physical address associated with a shared system memory to perform reverse TLB look-up operations.

FIG. 2 illustrates an aspect multi-core heterogeneous computing device 500 configured for utilizing a physical address associated with a shared system memory to perform reverse TLB look-up operations. The multi-core heterogeneous computing device 500 may be configured with circuitry, hardware, and/or various modules for performing hardware reverse TLB probe instructions without duplication of the TLB or memory entries and without a major time impact. In particular, the multi-core heterogeneous computing device 500 may include a content-addressable memory (referred to in FIG. 2 as 'CAM') 202 that may store a set of masks 206-208 corresponding to virtual addresses 203-205 that are associated with physical addresses. The CAM 202 may function as a TLB for a processor (e.g., an applications processor, a first processor, a second processor, etc.). The masks 206-208 may be used to control the number of most significant bits of page frame number or virtual address values and typically may be implemented as bit fields stored in TLB entries with their corresponding virtual addresses 203-205. In an aspect, the CAM 202 may also store a set of page frame numbers in association with the virtual addresses 203-205 and masks 206-208. For example, the CAM 202 may receive and store page frame numbers from a system page table for storage in TLB entries of related virtual addresses 203-205.

The multi-core heterogeneous computing device 500 may also include hardware/circuitry for receiving and storing a physical address input 220, such as within a register, system variable, or other buffer element, and may be referred to for the purposes of FIG. 2 as an "input module" 250. For example, in response to the multi-core heterogeneous computing device 500 detecting the instantiation of an API command for invalidating TLB entries using a physical address, the multi-core heterogeneous computing device 500 may store the physical address input 220 within a register associated with the input module 250. In an aspect, the input module 250 may be a part of the CAM 202. In another aspect, the input module 250 and/or the CAM 202 may be associated with an individual processor within the multi-core heterogeneous computing device 500.

The multi-core heterogeneous computing device 500 may also include a RAM controller 240 for managing shared system memory, such as the random access memory (or RAM 502). The RAM controller 240 may also utilize a hit vector, such as a buffer that may be used by the RAM controller 240 to store information associated with TLB look-up operations. For example, the RAM controller 240 may store indices (or entry indices) of the CAM 202 in response to detecting "hits" (i.e., matches between data stored in entries of the CAM 202 and a search token, such as a physical address). In an aspect, the hit vector may store multiple indices (or hits) of CAM 202 entries. The RAM controller 240 may be configured to burst read the RAM 502, such as by evaluating the data stored in each memory block of the RAM 502 entry by entry (or cycle by cycle). In particular, the RAM controller 240 may be configured to iteratively read the blocks 211-213 of the RAM 502 one at a time to identify the page frame numbers associated with each of the blocks 211-213. In an aspect, the multi-core heterogeneous computing device 500 may use one clock cycle for each entry the RAM controller 240 reads/evaluates. In an aspect, the page frame numbers may be indicated within a system page table associated with the RAM 502. In another aspect, the blocks 211-213 may be associated with the TLB entries of the CAM 202. For example, the page frame number of the first block 211 (e.g., "PFN_1") may be associated with the first virtual address 203 (e.g., "VA_1") and the first mask 206 (e.g., "Mask_1") stored in a TLB entry.

The RAM controller 240 may transmit signals 214 indicating the various page frame numbers, such as by transmitting a signal 214 indicating a page frame number (e.g., 'PFN_1,' 'PFN_2,' 'PFN_n,' etc.) in response to reading each of the blocks 211-213 of the RAM 502. The RAM controller 240 may transmit the individual page frame numbers iteratively and one at a time via the signals 214. The multi-core heterogeneous computing device 500 may be configured to receive at the CAM 202 the signals 214 transmitted via the RAM controller 240 and use the indicated page frame numbers for comparison or masking operations with data stored in the CAM 202.

In an aspect, the multi-core heterogeneous computing device 500 may be configured to transmit signals 210, 210' indicating the various masks 206-208 corresponding to the virtual addresses 203-205 stored in the CAM 202. For example, the multi-core heterogeneous computing device 500 may transmit the signals 210' for use by the input module 250 and/or signals 210 for use by the CAM 202. The individual masks 206-208 corresponding to the virtual addresses 203-205 stored in the CAM 202 may be transmitted iteratively and one at a time via the signals 210, 210'.

The multi-core heterogeneous computing device 500 may be configured to utilize mask apply components 201, 201' in combination with masks 206-208 transmitted via the signals 210, 210'. Such mask apply components 201, 201' may be circuitry, hardware, or a module for filtering, augmenting, decoding, combining, or otherwise changing two input values into a single, unique resulting value, such as a multiplexor or gate. For example, mask apply components 201, 201' may be hardware logic that applies a mathematical operation, a bit pattern, or equation to page frame number input values. As another example, mask apply components 201, 201' may apply one of the masks 206-208 as a bit pattern that indicates which bits of an address (e.g., a physical memory address) or frame number are to be zeroed out. In another aspect, mask apply components 201, 201' may be state machines.

The CAM 202 may be configured to apply the masks 206-208 via a first mask apply component 201, and the input module 250 may be configured to apply the masks 206-208 via a second mask apply component 201'. In particular, using the first mask apply component 201, the CAM 202 may be configured to apply the masks 206-208 individually indicated within the signals 210 to the page frame numbers individually indicated within the signals 214. For example, the CAM 202 may iteratively apply masks 206-208 via the first mask apply component 201 to page frame numbers transmitted via the signals 214 (e.g., 'PFN_1', etc.) to generate output values. In an aspect, the multi-core heterogeneous computing device 500 may be configured to reuse the data within the received signals 214 (i.e., reusing page frame numbers from the entries in the system page table) without duplication of the data. In other words, the CAM 202 may be configured to avoid duplicating the comparators during iterative applications of the masks 206-208 to page frame numbers via the first mask apply component 201, such as by buffering or otherwise storing the various page frame numbers received via the signals 214. The CAM 202 may transmit signals 265 that indicate output values from applying the masks 206-208 to the various page frame numbers via the first mask apply component 201.

Further, using a second mask apply component 201', the input module 250 may be configured to apply the masks 206-208 individually indicated within the signals 210' to the physical address input 220. For example, via the second mask apply component 201', the input module 250 may apply a first mask 206 to the physical address indicated by the physical address input 220 to generate an output value. The input module 250 may transmit signals 260 that indicate output values from applying the masks 206-208 via the second mask apply component 201'.

As the same masks 206-208 may be used by the CAM 202 and the input module 250 via the first and second mask apply components 201, 201' respectively, the output values transmitted in the signals 260, 265 may be the same when generated by applying the same mask to the same value (i.e., the physical address input 220 or the page frame numbers in the signals 214). For example, the output values from the first mask apply component 201 associated with the CAM 202 and the second mask apply component 201' associated with the input module 250 may be the same when the physical address input 220 is the same as a page frame number received by the CAM 202 via the signals 214.

The multi-core heterogeneous computing device 500 may utilize comparison circuitry 230 to determine whether output values resulting from applying the masks 206-206 via the mask apply components 201, 201' and transmitted by the signals 260, 265 are the same. In other words, the comparison circuitry 230 may be used to determine whether the CAM 202 and the input module 250 generated matching output values and, thus, whether both used their respective mask apply components 201, 201' with the same input values (i.e., whether there is a "hit"). Via the comparison circuitry 230, the CAM 202 may be configured to compare the output values in the signals 260 in parallel with the results of applying the masks 206-208 within the signals 210 to the page frame numbers received within the signals 214. When the comparison circuitry 230 determines that the output values from the signals 260, 265 are the same (i.e., a "hit"), signals 270 may be transmitted to the RAM controller 240 that indicate CAM 202 (or TLB) entries or entry indices corresponding to the input values (i.e., the masks 206-208) used with the mask apply components 201, 201' to generate the same output values. In an aspect, the CAM 202 may perform parallel comparisons by utilizing a plurality of comparison circuits, such as one for each entry in the CAM 202.

Figure 3A:
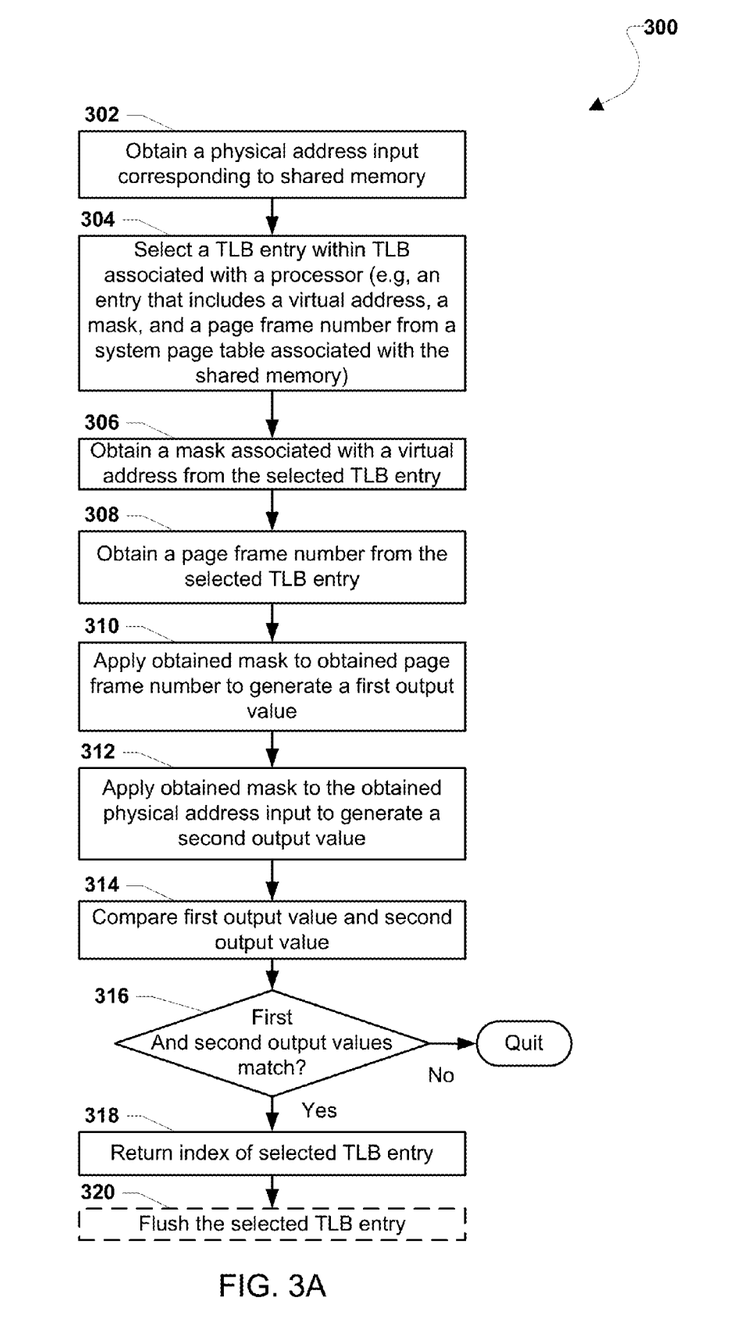
FIGS. 3A-3B are process flow diagrams illustrating aspect methods for a multi-core heterogeneous computing device to utilize a physical address associated with a shared system memory to perform reverse TLB look-up operations.

FIG. 3A illustrates an aspect method 300 for processor of a multi-core heterogeneous computing device to utilize a physical address associated with a shared system memory to perform reverse TLB look-up operations. The method 300 may be performed to identify TLB entries that correspond to particular physical addresses, such as entries that may need to be modified or flushed in response to actions performed by other processors within the multi-core heterogeneous computing device. For example, in response to a first processor modifying content within a shared memory block of RAM, a second processor in the multi-core heterogeneous computing device may perform the method 300 as part of a TLB shoot-down mechanism. In various aspects, the method 300 may be implemented in processors within the multi-core heterogeneous computing device via an instruction, software method, or hardware, as described above. For simplicity of description, the aspect operations of the method 300 are described below with reference to a "first processor" within the multi-core heterogeneous computing device.

In block 302, the first processor within the multi-core heterogeneous computing device may obtain a physical address input corresponding to a shared memory, such as by receiving the physical address input with the first processor in relation to an API command. The physical address input may be a system memory block identifier, page frame number or identifier, or other index value relevant to the shared system memory. The multi-core heterogeneous computing device may monitor for instantiations of instructions, API commands, and/or methods that indicate the physical address, such as called commands for a TLB entry corresponding to the physical address is to be invalidated or flushed. For example, the multi-core heterogeneous computing device may detect that an API command "Invalidate(PA)" has been called for execution, where 'PA' is an input variable or parameter that represents a particular physical address to be invalidated.

In block 304, the first processor may select a TLB entry within the TLB associated with the first processor. In various aspects, the selected TLB entry may include a virtual address, a mask associated with the virtual address, and a page frame number from a system page table associated with the shared memory of the device. For example, the TLB entry may be a data table record that includes various data, including a certain virtual address, a bit pattern mask, and an associated page frame number from a system page table. The TLB entry may have a corresponding index or other identifier, such as a data table index, that may be used to reference the information stored in association with the TLB entry. In an aspect, the TLB may be a CAM as described above.

In block 306, the first processor may obtain a mask associated with a virtual address from the selected TLB entry. Each TLB entry may include a mask that may be of various mask sizes (e.g., 4K, 4 MB, etc.). The mask may be a bit pattern or a bit representation. The first processor may obtain a page frame number from the selected TLB entry in block 308. In an aspect, to avoid redundant cycles and avoid bottlenecks, at the time of TLB population, the multi-core heterogeneous computing device via the first processor may get page frame numbers for writing into the TLB, and so there may not be a need to fetch anything from system memory during the performance of the method 300. For example, the obtained page frame number may be a physical address of a page currently stored in the system memory that was retrieved from a system page table for storage in the TLB prior to runtime. In an aspect, the page frame number may be information indicating an index or memory block identifier.

In block 310, the first processor may apply the obtained mask to the obtained page frame number to generate a first output value. As described above, the first processor may apply the mask via a filter, equation, method, or other operation that takes input values (e.g., the obtained mask and the obtained page frame number) and generates an output value that can be replicated or repeated using the same input values. For example, the first processor may apply a mask bit pattern to the obtained page frame number to zero-out bits. In other words, when the same mask is used with a same input value (e.g., the page frame number), the same output value will be generated. Similar to the operations in block 310, the first processor may apply the obtained mask to the obtained physical address input to generate a second output value in block 312.

In block 314, the first processor may compare the first output value and the second out value. For example, the first processor within may perform a pattern-matching, mathematical, or other comparison operation to the first and second output values to detect equivalency. In determination block 316, the first processor may determine whether the first output value and the second output value match, such as based on the comparison operations. If the first and second output values are determined not to match (i.e., determination block 316="No"), the first processor may end the method 300. If the first and second output values match (i.e., determination block 316="Yes"), the first processor may return the index of the selected TLB entry in block 318. For example, the first processor may transmit the index of the matching TLB entry to the TLB (e.g., a CAM) for use in invalidation or flush operations (or flushing operations). Using the returned index, in optional block 320 the first processor may flush the selected TLB entry. For example, the first processor may negate, remove, invalidate, or otherwise nullify the virtual address and other information stored in association with the selected TLB entry based on the reverse TLB look-up operations.

Figure 3B:
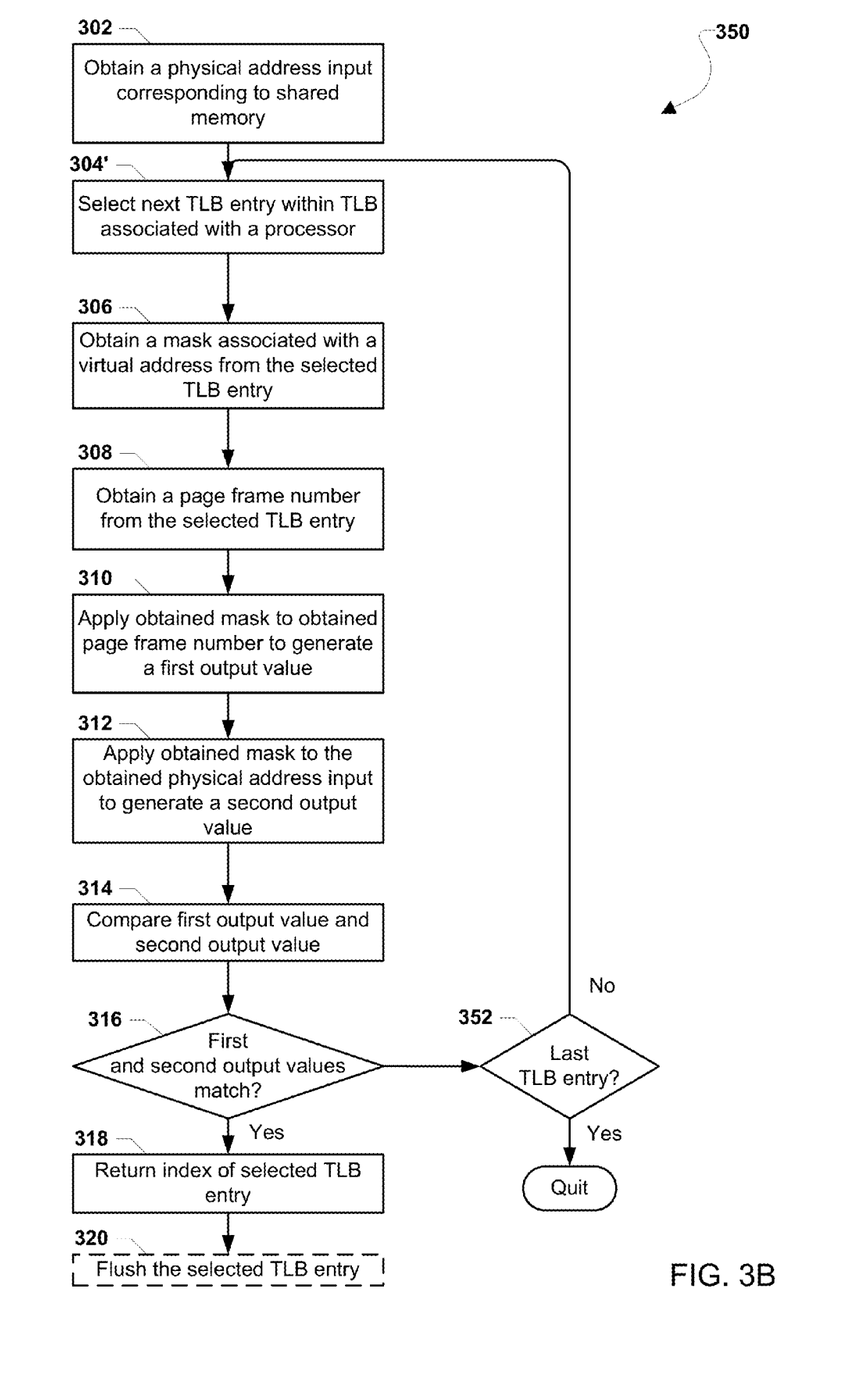

FIG. 3B illustrates another aspect method 350 for processors within a multi-core heterogeneous computing device to utilize a physical address associated with a shared system memory to perform reverse TLB look-up operations. The method 350 is similar to the method 300 described above with reference to FIG. 3A, except that the method 350 includes operations for enabling an operational loop that enable processors within the multi-core heterogeneous computing device to iteratively generate output values with each page frame number related to the system memory and each mask associated with virtual addresses indicated in a TLB. In other words, the multi-core heterogeneous computing device may be configured to iteratively obtain masks and page frame numbers from TLB entries, iteratively apply the obtained masks to the obtained page frame numbers as well as a received/obtained physical address (or physical address input), and iteratively compare the resulting output values to determine whether there are any matches. In various aspects, the method 350 may be implemented in processors within the multi-core heterogeneous computing device via an instruction, software method, or dedicated hardware, as described above. Again, for simplicity of description, the aspect operations of the method 350 are described below with reference to a "first processor" within the multi-core heterogeneous computing device.

In block 302, a first processor within the multi-core heterogeneous computing device may obtain a physical address input corresponding to a shared memory. In block 304', the first processor may select a next TLB entry within the TLB associated with the first processor. The operations in block 304' may be the same as described above in block 304 with reference to FIG. 3A; however, the first processor may be configured to select TLB entries in order. For example, the next TLB entry may be the first TLB entry when the method 350 is first executed. In block 306, the first processor may obtain a mask associated with a virtual address from the selected TLB entry. The first processor may obtain a page frame number from the selected TLB entry in block 308. In block 310, the first processor may apply the obtained mask to the obtained page frame number to generate a first output value. In block 312, the first processor may apply the obtained mask to the obtained physical address input to generate a second output value.

In block 314, the first processor may compare the first output value and the second out value. In determination block 316, the first processor may determine whether the first output value and the second output value match, such as based on the comparison operations. If the first and second output values are determined not to match (i.e., determination block 316="No"), in determination block 352 the first processor may determine whether the selected TLB entry is the last entry in the TLB. If it is determined that the selected TLB entry is the last TLB entry (i.e., determination block 352="Yes"), the first processor may end the method 350. However, if it is determined that the selected TLB entry is not the last TLB entry (i.e., determination block 352="No"), the first processor may continue with the operations in block 304' by selecting the next TLB entry and continuing to generate and evaluate various output values. If the first and second output values are determined to match (i.e., determination block 316="Yes"), the first processor may return the index of the selected TLB entry in block 318. Using the returned index, the first processor may flush the selected TLB entry in optional block 320.

Various processors in a multi-core heterogeneous computing device may be configured to execute hand-shaking operations or protocols to implement TLB shoot-down mechanisms. For example, when a first processor determines that translation information related to a virtual address within its TLB needs to be modified, the first processor may clear its active flag (e.g., a bit/variable accessible to the operating system of the multi-core heterogeneous computing device), lock a system page table (e.g., the page table associated with system memory), flush TLB entries related to the virtual address, send a message (or interrupt) to a second processor describing the TLB actions to be performed (e.g., invalidate a TLB entry), and busy-wait until the active flag of the second processor is clear. In response to receiving the message, the second processor may clear its active flag and busy-wait until the system page table is locked (i.e., wait until it is safe to modify the TLB local to the second processor). When the second processor's active flag is cleared, the first processor may then modify the page-table of the system memory, set its active flag, unlock the system page table, and continue executing its regular processes. The second processor may then execute the TLB actions indicated in the message (e.g., invalidate TLB entries), set its active flag, and continue execution of its processes. However, such a conventional hand-shaking mechanism may rely on virtual address parity between processors and/or costly serial operations to maintain coherency in the multi-core heterogeneous computing device.

Figure 4:
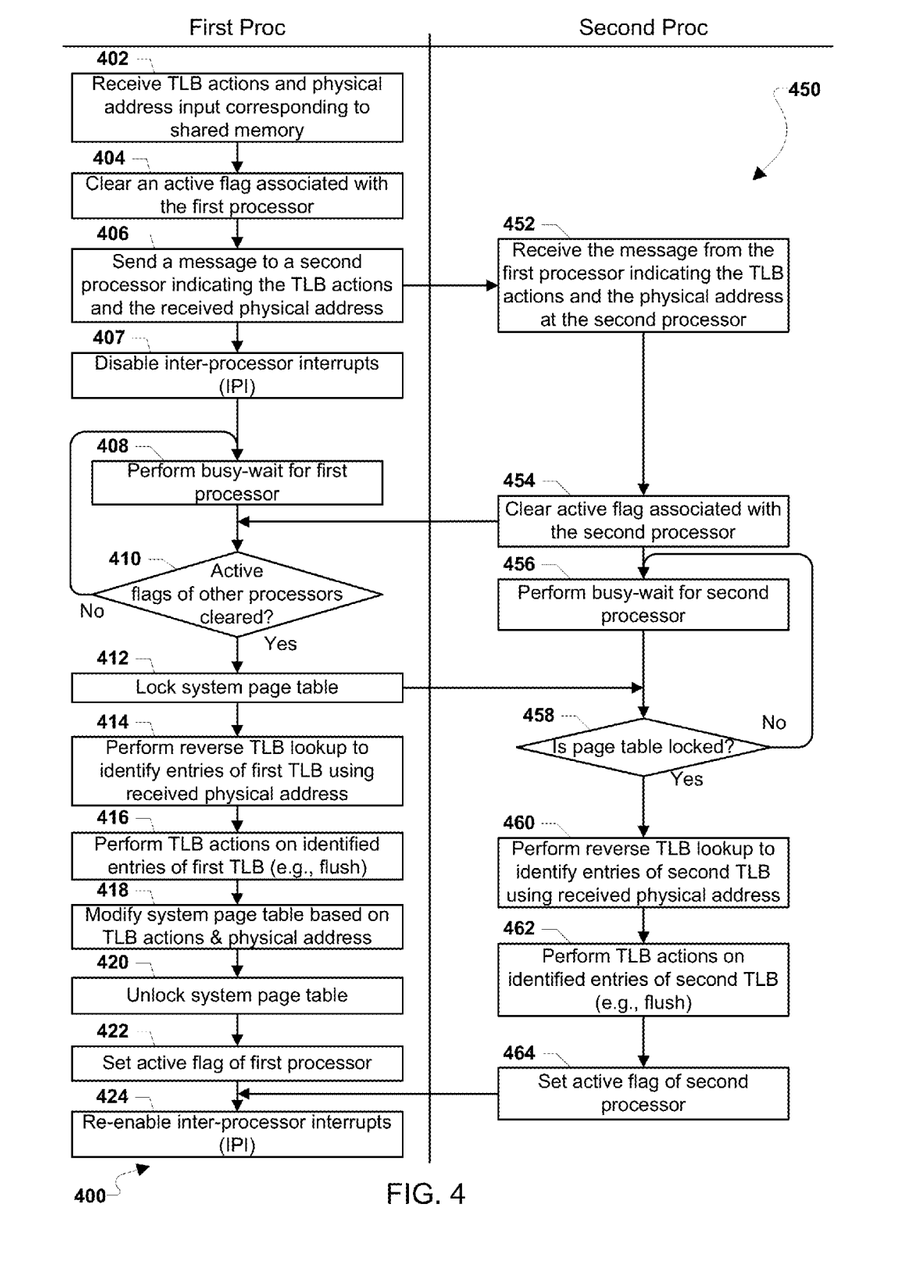
FIG. 4 is a process flow diagram illustrating aspect methods using reverse TLB look-up operations performed by a first processor and a second processor within a multi-core heterogeneous computing device.

FIG. 4 illustrates an aspect method 400 for a multi-core heterogeneous computing device to utilize a physical address to invalidate (or flush) a first TLB entry associated with a first processor and an aspect method 450 for utilizing the physical address to invalidate a second TLB entry associated with a second processor. In other words, FIG. 4 illustrates methods 400, 450 that may be performed by two processors in tandem to enable an enhanced TLB shoot-down mechanism for invalidating TLB entries for the first and second processor that correspond to a physical frame number matching the physical address. In various aspects, the methods 400, 450 may be performed by various processors of the multi-core heterogeneous computing device as concurrently executing software, applications, routines, or operating system threads.

In block 402, a first processor within the multi-core heterogeneous computing device may receive TLB actions and a physical address input corresponding to a shared memory. For example, the multi-core heterogeneous computing device may receive an API call for flushing an entry of a TLB associated with the first processor. The TLB action and/or the physical address input may be received as data within an interrupt. In block 404, the first processor may clear an active flag associated with the first processor, such as by zeroing-out a system bit or variable associated with the first processor. Such active flags may be accessible or otherwise visible to the various processors within the multi-core heterogeneous computing device and/or operating system routines executing on the multi-core heterogeneous computing device. The first processor may send a message, such as an interrupt, to a second processor indicating the TLB actions and the received physical address in block 406. In block 407, the first processor may be configured to disable inter-processor interrupts (or IPI) in response to receiving the TLB actions and physical address input. The first processor may then perform busy-waiting operations in block 408, such as by entering a sleep or wait mode for a period of time, and in determination block 410 may determine whether the active flags of the other processors within the multi-core heterogeneous computing device have been cleared. In an aspect, the first processor may periodically evaluate stored information indicating the active flags of all processor, or alternatively may receive a signal or message when various processors clear or set their respective active flags. If the first processor determines that all of the active flags are not cleared (i.e., determination block 410="No"), the first processor may continue with the busy-wait operations in block 408.

Referring to the method 450, in response to the execution of the operations in block 406 by the first processor, in block 452 the second processor within the multi-core heterogeneous computing device may receive the message from the first processor indicating the TLB actions and the physical address. In block 454, the second processor may clear its active flag based on the received message. The second processor may then perform busy-waiting operations in block 456, such as by entering a sleep or wait mode for a period of time, and in determination block 458 may determine whether the system page table has been locked by the first processor. In an aspect, the second processor may periodically evaluate stored information indicating the locked status of the system page table, or alternatively may receive a signal or message when the system page table is locked, such as a signal via the operating system of the multi-core heterogeneous computing device. If the second processor determines that the system page table has not been locked by the first processor (i.e., determination block 458="No"), the second processor may continue with the busy-wait operations in block 456.

Referring back to the method 400, if the first processor determines that all of the active flags are cleared (i.e., determination block 410="Yes"), in block 412, the first processor may lock the system page table, such as the page table associated with the shared memory. This may be accomplished by the first processor setting an operating system bit, variable, or indicator, or alternatively by executing a system API call for locking the page table of the shared memory.

In block 414, the first processor may perform reverse TLB look-up operations to identify entries of a first TLB associated with the first processor using the received physical address. In various aspects, the first processor may perform the reverse TLB look-up operations by performing the method 350 described above with reference to FIG. 3B, executing an API command for finding TLB entries associated with the physical address, and/or executing a hardware-implemented reverse TLB look-up instruction as described above. For example, the operations of block 414 may include operations of the method 350 of FIG. 3B described above or the use of reverse TLB look-up hardware such as described above with reference to FIG. 2.

In block 416, the first processor may perform the TLB actions on the identified entries of the first TLB. For example, the first processor may flush or otherwise invalidate the identified entries that correspond to the physical address. The first processor may modify the system page table based on the TLB actions and the physical address in block 418, such as by clearing a block or range of pages in the shared memory. In block 420, the first processor may unlock the system page table and set the active flag of the first processor in block 422. The first processor may then re-enable inter-processor interrupts (IPI) in block 424 and continue with regular operations, such as executing software routines in progress prior to receiving the TLB actions and physical address. In an embodiment, the first processor may re-enable inter-processor interrupts in response to the second processor setting its active flag with the operations described below with reference to block 464.

Referring back to the method 450, if the second processor determines that the system page table has been locked by the first processor (i.e., determination block 458="Yes"), the second processor may perform reverse TLB look-up operations to identify entries of the second TLB associated with the second processor using the received physical address. The operations in block 460 may be similar to those described above with reference to block 414, except that the operations in block 460 may be performed by the second processor to identify TLB entries associated with the second processor. For example, the second processor may perform operations of the method 350 in FIG. 3B described above. In block 462, the second processor may perform the TLB actions on the identified entries of the second TLB, such as flushing or invalidating the TLB entries identified using the reverse TLB look-up method, API command, or hardware such as described above with reference to FIG. 2. In block 464, the second processor may set its active flag and continue executing other routines, such as pending or previously launched applications or routines.

Figure 5:
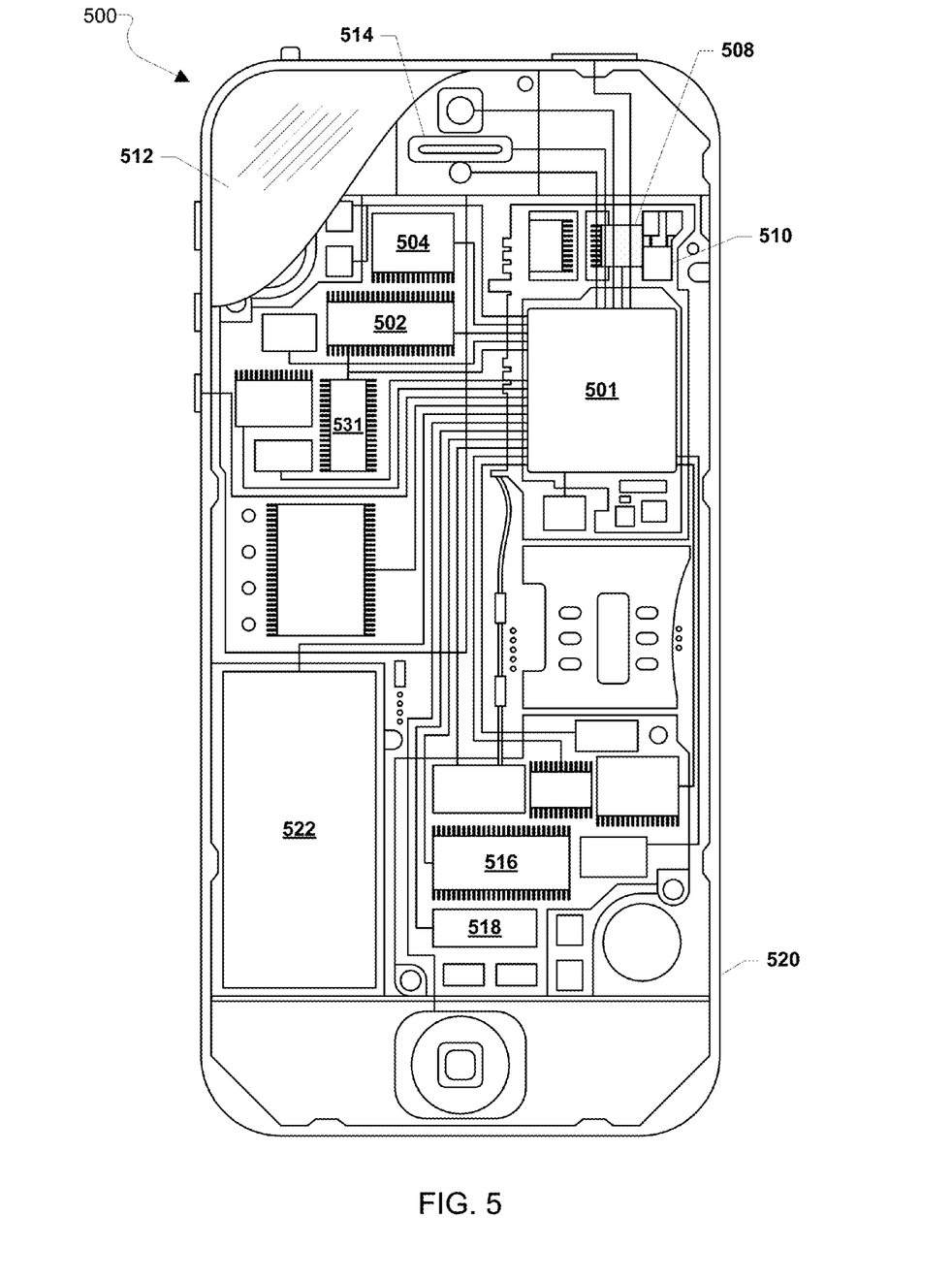
FIG. 5 is a component block diagram of a multi-core heterogeneous computing device suitable for use in various aspects.

FIG. 5 is a system block diagram of a multi-core heterogeneous computing device 500 suitable for use with various aspects. In various embodiments, the multi-core heterogeneous computing device 500 may include a processor 501 coupled to a touchscreen controller 504 and an internal memory 502. The processor 501 may be one or more multi-core ICs designated for general or specific processing tasks. In an aspect, the multi-core heterogeneous computing device 500 may include a second processor 531 coupled to the internal memory 502. In an aspect, the first processor 501 may be an applications processor and the second processor 531 may be an auxiliary processor (e.g., a digital signal processor, a graphics processor (or GPU), etc.). The internal memory 502 may be volatile or non-volatile memory, and may also be secure and/or encrypted memory, or unsecure and/or unencrypted memory, or any combination thereof. The touchscreen controller 504 and the processor 501 may also be coupled to a touchscreen panel 512, such as a resistive-sensing touchscreen, capacitive-sensing touchscreen, infrared sensing touchscreen, etc. The multi-core heterogeneous computing device 500 may have one or more radio signal transceivers 508 (e.g., Peanut®, Bluetooth®, Zigbee®, Wi-Fi, RF radio) and antennae 510, for sending and receiving, coupled to each other and/or to the processor 501. The transceivers 508 and antennae 510 may be used with the above-mentioned circuitry to implement the various wireless transmission protocol stacks and interfaces. The multi-core heterogeneous computing device 500 may include a cellular network wireless modem chip 516 that enables communication via a cellular network and is coupled to the processor. The multi-core heterogeneous computing device 500 may include a peripheral device connection interface 518 coupled to the processor 501. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The multi-core heterogeneous computing device 500 may also include speakers 514 for providing audio outputs. The multi-core heterogeneous computing device 500 may also include a housing 520, constructed of a plastic, metal, or a combination of materials, for containing all or some of the components discussed herein. The multi-core heterogeneous computing device 500 may include a power source 522 coupled to the processor 501, such as a disposable or rechargeable battery. The rechargeable battery may also be coupled to the peripheral device connection port to receive a charging current from a source external to the multi-core heterogeneous computing device 500.

The processors 501 and 531 may be any programmable microprocessor, microcomputer or multiple processor chip or chips that can be configured by software instructions (applications) to perform a variety of functions, including the functions of the various aspects described above. In the various devices, multiple processors may be provided, such as one processor dedicated to wireless communication functions and one processor dedicated to running other applications. Typically, software applications may be stored in the internal memory 502 before they are accessed and loaded into the processors 501 and 531. The processors 501 and 531 may include internal memory sufficient to store the application software instructions. In many devices the internal memory may be a volatile or nonvolatile memory, such as flash memory, or a mixture of both. For the purposes of this description, a general reference to memory or system memory refers to memory accessible by the processors 501 and 531 including internal memory or removable memory plugged into the various devices and memory within the processors 501 and 531.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable or server-readable medium or a non-transitory processor-readable storage medium. The steps of a method or algorithm disclosed herein may be embodied in a processor-executable software module which may reside on a tangible, non-transitory computer-readable storage medium, a non-transitory server-readable storage medium, and/or a non-transitory processor-readable storage medium. In various aspects, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for performing a reverse translation lookaside buffer (TLB) look-up using a physical address input, comprising:
    obtaining with a first processor the physical address input, wherein the physical address input indicates a physical address corresponding to a shared memory;
    obtaining a first mask associated with a first virtual address from a first TLB entry within a TLB associated with the first processor, wherein the obtained first mask is a bit pattern;
    obtaining from the first TLB entry a first page frame number associated with the shared memory;
    applying the obtained first mask to the obtained first page frame number to generate a first value;
    applying the obtained first mask to the obtained physical address input to generate a second value; and
    comparing the first value and the second value to determine whether the first value and the second value match.

2. The method of claim 1, further comprising:
    iteratively obtaining a second mask and a second page frame number from other TLB entries within the TLB in response to determining that the first value and the second value do not match;
    iteratively applying the obtained second mask to the obtained second page frame number to generate the first value; and
    iteratively applying the obtained second mask to the obtained physical address input to generate the second value,
    wherein comparing the first value and the second value to determine whether the first value and the second value match comprises iteratively comparing the first value and the second value to determine whether the first value and the second value match.

3. The method of claim 2, wherein iteratively applying the obtained second mask to the obtained second page frame number to generate the first value comprises reusing page frame numbers from entries in a system page table without duplication.

4. The method of claim 1, further comprising flushing the first TLB entry in response to determining that the first value and the second value match.

5. The method of claim 1, further comprising sending a message indicating TLB actions and the physical address to a second processor, wherein the TLB actions include a TLB flush operation.

6. The method of claim 1, further comprising returning an index of the first TLB entry in response to determining that the first value and the second value match.

7. The method of claim 6, wherein obtaining with the first processor the physical address input comprises receiving a message from a second processor including TLB actions and the physical address, the method further comprising:
    clearing an active flag in response to receiving the message transmitted by the second processor;
    performing the TLB actions indicated in the received message using the returned index of the first TLB entry; and
    setting the active flag in response to performing the TLB actions.

8. A multi-core heterogeneous computing device, comprising:
    means for obtaining with a first processor a physical address input, wherein the physical address input indicates a physical address corresponding to a shared memory;
    means for obtaining a first mask associated with a first virtual address from a first TLB entry within a TLB associated with the first processor, wherein the obtained first mask is a bit pattern;
    means for obtaining from the first TLB entry a first page frame number associated with the shared memory;
    means for applying the obtained first mask to the obtained first page frame number to generate a first value;
    means for applying the obtained first mask to the obtained physical address input to generate a second value; and
    means for comparing the first value and the second value to determine whether the first value and the second value match.

9. The multi-core heterogeneous computing device of claim 8, further comprising:
    means for iteratively obtaining a second mask and a second page frame number from other TLB entries within the TLB in response to determining that the first value and the second value do not match;
    means for iteratively applying the obtained second mask to the obtained second page frame number to generate the first value; and
    means for iteratively applying the obtained second mask to the obtained physical address input to generate the second value,
    wherein means for comparing the first value and the second value to determine whether the first value and the second value match comprises means for iteratively comparing the first value and the second value to determine whether the first value and the second value match.

10. The multi-core heterogeneous computing device of claim 9, wherein means for iteratively applying the obtained second mask to the obtained second page frame number to generate the first value comprises means for reusing page frame numbers from entries in a system page table without duplication.

11. The multi-core heterogeneous computing device of claim 8, further comprising means for flushing the first TLB entry in response to determining that the first value and the second value match.

12. The multi-core heterogeneous computing device of claim 8, further comprising means for sending a message indicating TLB actions and the physical address to a second processor, wherein the TLB actions include a TLB flush operation.

13. The multi-core heterogeneous computing device of claim 8, further comprising means for returning an index of the first TLB entry in response to determining that the first value and the second value match.

14. The multi-core heterogeneous computing device of claim 13, wherein means for obtaining with the first processor the physical address input comprises means for receiving a message from a second processor including TLB actions and the physical address, the multi-core heterogeneous computing device further comprising:
means for clearing an active flag in response to receiving the message transmitted by the second processor;
means for performing the TLB actions indicated in the received message using the returned index of the first TLB entry; and
means for setting the active flag in response to performing the TLB actions.

15. A multi-core heterogeneous computing device, comprising:
a first processor;
a second processor; and
a shared memory, wherein the first processor is configured with processor-executable instructions to perform operations comprising:
obtaining with the first processor a physical address input, wherein the physical address input indicates a physical address corresponding to the shared memory;
obtaining a first mask associated with a first virtual address from a first TLB entry within a TLB associated with the first processor, wherein the obtained first mask is a bit pattern;
obtaining from the first TLB entry a first page frame number associated with the shared memory;
applying the obtained first mask to the obtained first page frame number to generate a first value;
applying the obtained first mask to the obtained physical address input to generate a second value; and
comparing the first value and the second value to determine whether the first value and the second value match.

16. The multi-core heterogeneous computing device of claim 15, wherein the first processor is configured with processor-executable instructions to perform operations further comprising:
iteratively obtaining a second mask and a second page frame number from other TLB entries within the TLB in response to determining that the first value and the second value do not match;
iteratively applying the obtained second mask to the obtained second page frame number to generate the first value; and
iteratively applying the obtained second mask to the obtained physical address input to generate the second value,
wherein comparing the first value and the second value to determine whether the first value and the second value match comprises iteratively comparing the first value and the second value to determine whether the first value and the second value match.

17. The multi-core heterogeneous computing device of claim 16, wherein the first processor is configured with processor-executable instructions to perform operations such that iteratively applying the obtained second mask to the obtained second page frame number to generate the first value comprises reusing page frame numbers from entries in a system page table without duplication.

18. The multi-core heterogeneous computing device of claim 15, wherein the first processor is configured with processor-executable instructions to perform operations further comprising flushing the first TLB entry in response to determining that the first value and the second value match.

19. The multi-core heterogeneous computing device of claim 15, wherein the first processor is configured with processor-executable instructions to perform operations further comprising sending a message indicating TLB actions and the physical address to the second processor, wherein the TLB actions include a TLB flush operation.

20. The multi-core heterogeneous computing device of claim 15, wherein the first processor is configured with processor-executable instructions to perform operations further comprising returning an index of the first TLB entry in response to determining that the first value and the second value match.

21. The multi-core heterogeneous computing device of claim 20, wherein the first processor is configured with processor-executable instructions to perform operations such that obtaining with the first processor the physical address input comprises receiving a message from the second processor including TLB actions and the physical address, and
wherein the first processor is configured with processor-executable instructions to perform operations further comprising:
clearing an active flag in response to receiving the message transmitted by the second processor;
performing the TLB actions indicated in the received message using the returned index of the first TLB entry; and
setting the active flag in response to performing the TLB actions.

22. A non-transitory processor-readable storage medium having stored thereon processor-executable software instructions configured to cause a first processor to perform operations comprising:
obtaining with the first processor a physical address input, wherein the physical address input indicates a physical address corresponding to a shared memory;
obtaining a first mask associated with a first virtual address from a first TLB entry within a TLB associated with the first processor, wherein the obtained first mask is a bit pattern;
obtaining from the first TLB entry a first page frame number associated with the shared memory;
applying the obtained first mask to the obtained first page frame number to generate a first value;
applying the obtained first mask to the obtained physical address input to generate a second value; and
comparing the first value and the second value to determine whether the first value and the second value match.

23. The non-transitory processor-readable storage medium of claim 22, wherein the stored processor-executable software instructions are configured to cause the first processor to perform operations further comprising:
iteratively obtaining a second mask and a second page frame number from other TLB entries within the TLB in response to determining that the first value and the second value do not match;
iteratively applying the obtained second mask to the obtained second page frame number to generate the first value; and
iteratively applying the obtained second mask to the obtained physical address input to generate the second value,
wherein comparing the first value and the second value to determine whether the first value and the second value match comprises iteratively comparing the first value and the second value to determine whether the first value and the second value match.

24. The non-transitory processor-readable storage medium of claim 23, wherein the stored processor-executable software instructions are configured to cause the first processor to perform operations such that iteratively applying the obtained second mask to the obtained second page frame number to generate the first value comprises reusing page frame numbers from entries in a system page table without duplication.

25. The non-transitory processor-readable storage medium of claim 22, wherein the stored processor-executable software instructions are configured to cause the first processor to perform operations further comprising flushing the first TLB entry in response to determining that the first value and the second value match.

26. The non-transitory processor-readable storage medium of claim 22, wherein the stored processor-executable software instructions are configured to cause the first processor to perform operations further comprising sending a message indicating TLB actions and the physical address to a second processor, wherein the TLB actions include a TLB flush operation.

27. The non-transitory processor-readable storage medium of claim 22, wherein the stored processor-executable software instructions are configured to cause the first processor to perform operations further comprising returning an index of the first TLB entry in response to determining that the first value and the second value match.

28. The non-transitory processor-readable storage medium of claim 27, wherein the stored processor-executable software instructions are configured to cause the first processor to perform operations such that obtaining with the first processor the physical address input comprises receiving a message from a second processor including TLB actions and the physical address, and
    wherein the stored processor-executable software instructions are configured to cause the first processor to perform operations further comprising:
        clearing an active flag in response to receiving the message transmitted by the second processor;
        performing the TLB actions indicated in the received message using the returned index of the first TLB entry; and
        setting the active flag in response to performing the TLB actions.

* * * * *